US009736765B2

United States Patent
Yiu et al.

(10) Patent No.: US 9,736,765 B2
(45) Date of Patent: Aug. 15, 2017

(54) LOAD BALANCING IN A WIRELESS CELLULAR NETWORK BASED ON USER EQUIPMENT MOBILITY

(71) Applicant: Intel IP Corporation, Santa Clara, CA (US)

(72) Inventors: Candy Yiu, Portland, OR (US); Youn Hyoung Heo, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/535,651

(22) Filed: Nov. 7, 2014

(65) Prior Publication Data
US 2015/0312826 A1 Oct. 29, 2015

Related U.S. Application Data (60) Provisional application No. 61/985,387, filed on Apr. 28, 2014.

(51) Int. Cl.
*H04W 36/00* (2009.01)
*H04W 48/16* (2009.01)
*H04W 48/20* (2009.01)

(52) U.S. Cl.
CPC ............ *H04W 48/16* (2013.01); *H04W 48/20* (2013.01)

(58) Field of Classification Search
CPC combination set(s) only.
See application file for complete search history.

(56) References Cited

U.S. PATENT DOCUMENTS

| 2010/0093350 A1 | 4/2010 | Wang et al. |
| 2010/0273485 A1 | 10/2010 | Huang et al. |
| 2014/0004862 A1* | 1/2014 | Ekemark ............... H04W 72/06 455/443 |

(Continued)

FOREIGN PATENT DOCUMENTS

| WO | WO2013-073876 A1 | 5/2013 |
| WO | WO2013-151360 A1 | 10/2013 |

OTHER PUBLICATIONS

3GPP; Technical Specification Group Radio Access Network; Evolved Universal Terrestrial Radio Access (E-UTRA); User Equipment (UE) procedures in idle mode (Release 12); 3GPP TS 36.304 v12.0.0; 3GPP Organizational Partners, Mar. 2014, 34 pages.

(Continued)

*Primary Examiner* — Idowu O Osifade
(74) *Attorney, Agent, or Firm* — Schwabe, Williamson & Wyatt, P.C.

(57) ABSTRACT

Embodiments of the present disclosure describe systems, devices, and methods for load balancing in a wireless communication network based on user equipment (UE) mobility. In embodiments, a UE may receive a plurality of cell reselection priority configurations designated for different levels of UE mobility. The UE may determine its mobility and select one of the cell reselection priority configurations based on the determined mobility. The UE may establish a radio resource control (RRC) connection, such as an RRC idle mode connection, on a carrier frequency and/or cell based on the selected cell reselection priority configuration. Other embodiments may be described or claimed.

8 Claims, 8 Drawing Sheets

(56) References Cited

U.S. PATENT DOCUMENTS

2014/0036868 A1* 2/2014 Guo ................... H04W 36/165
370/331
2014/0146794 A1* 5/2014 Dalsgaard .............. H04W 8/02
370/332

OTHER PUBLICATIONS

International Search Report and Written Opinion mailed Jun. 23, 2015 from International Application No. PCT/US2015/019999.
3GPP, "Technical Specification Group Services and System Aspects; Architecture enhancements to facilitate communications with packet data networks and applications (Release 12)," 3GPP TS 23.682 V12.1.0 (Mar. 2014), Mar. 10, 2014, Lte Advanced, 32 pages.
3GPP, "Technical Specification Group Services and System Aspects; Feasibility study on 3GPP system to Wireless Local Area Network (WLAN) interworking (Release 11)," 3GPP TR 22.934 V11.0.0 (Sep. 2012), Sep. 21, 2012, Lte Advanced, 30 pages.

* cited by examiner

LOAD BALANCING IN A WIRELESS CELLULAR NETWORK BASED ON USER EQUIPMENT MOBILITY

CROSS-REFERENCE TO RELATED APPLICATION

This application claims the benefit of U.S. Provisional Application No. 61/985,387, filed Apr. 28, 2014, entitled "CELL SPECIFIC LOAD BALANCING BASED ON UE SPEED;" the entirety of the above listed application is hereby incorporated reference.

FIELD

Embodiments of the present disclosure generally relate to the field of wireless communication, and more particularly, to load balancing based on user equipment mobility.

BACKGROUND

In Long Term Evolution (LTE) networks, network services may be provided to user equipments (UEs) via multiple cells that cover overlapping geographical areas. The cells may include cells of different transmission powers (e.g., high power macro cells, medium power micro cells, and low power pico cells or femto cells). The LTE network can change the cell to which UEs are connected to balance the network load across the cells.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the term "or" is used as an inclusive term to mean at least one of the components coupled with the term. For example, the phrase "A or B" means (A), (B), or (A and B); and the phrase "A, B, or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality.

Figure 1:
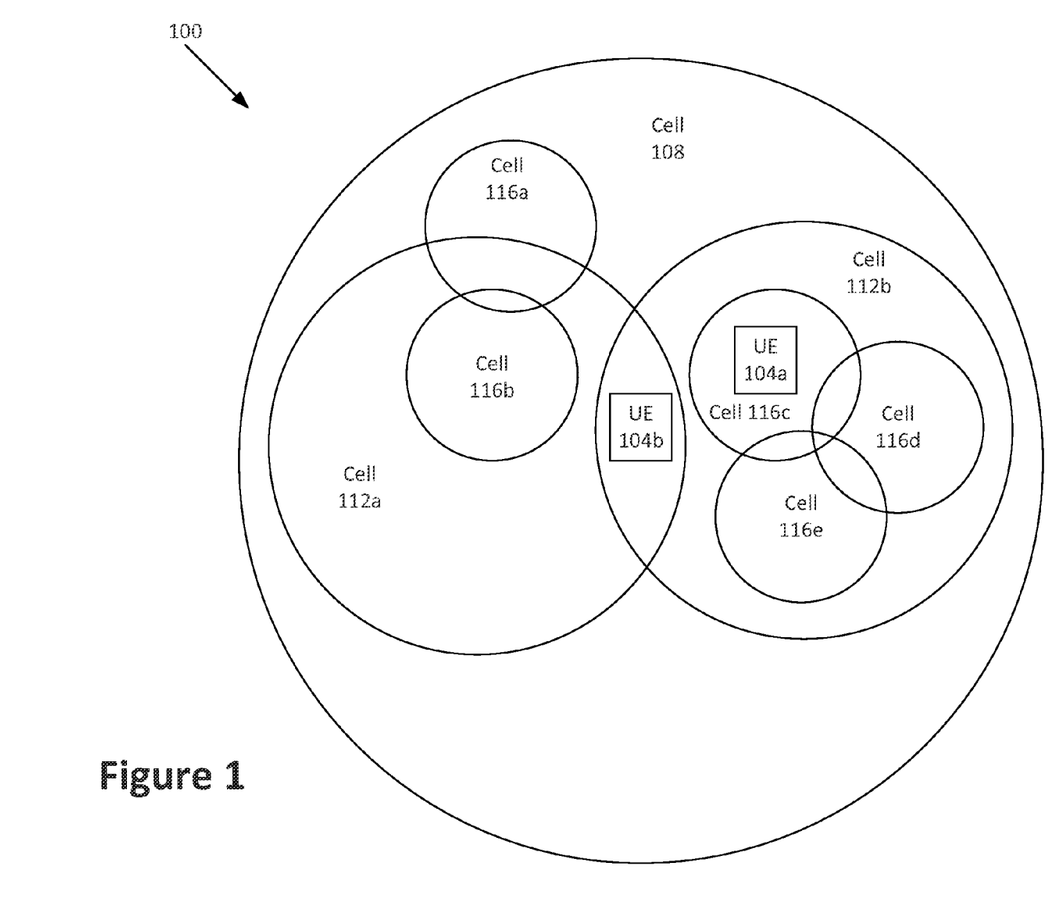
FIG. 1 schematically illustrates a wireless communication network environment in accordance with various embodiments.
Figure 3:
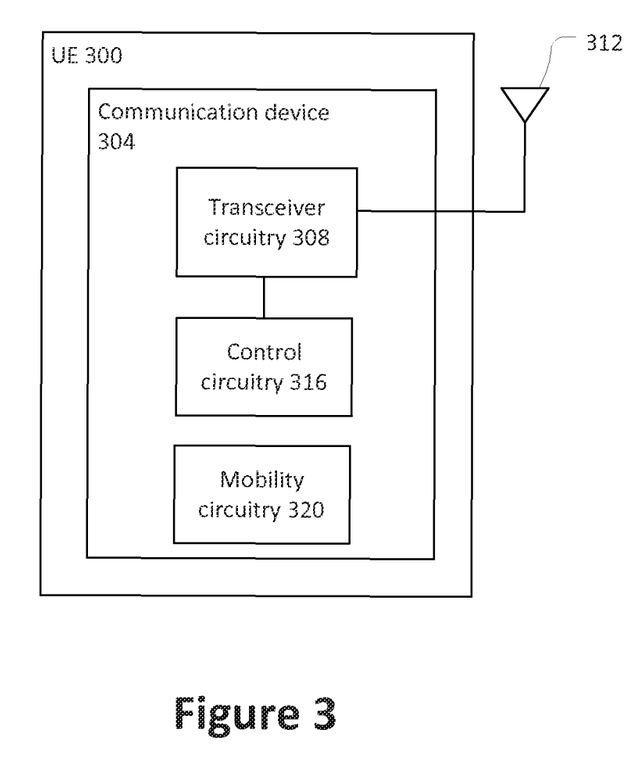
FIG. 3 schematically illustrates a user equipment (UE) in accordance with various embodiments.

FIG. 1 schematically illustrates a network environment 100 (hereinafter "network") in accordance with various embodiments. The environment 100 may include a user equipment (UE) 104a and/or a UE 104b in wireless communication via one or more cells 108, 112a, 112b, 116a, 116b, 116c, 116d, and/or 116e. The cells 108, 112a-b, and/or 116a-e may be associated with respective access nodes (e.g., evolved Node Bs (eNBs) of the network 100). An example eNB 300 is illustrated in FIG. 3 and discussed further below. In some embodiments, one eNB may provide network services via more than one cell 108, 112a-b, and/or 116a-e.

The cells 108, 112a-b, and/or 116a-e may be part of a 3rd Generation Partnership Project (3GPP) long-term evolution (LTE) network (or an LTE-Advanced (LTE-A) network). In particular, the cells 108, 112a-b, and/or 116a-e may be part of one or more radio access networks (RANs) of the LTE/LTE-A network, such as one or more evolved universal terrestrial radio access networks (E-UTRANs). The E-UTRANs may be coupled with a core network such as an Evolved Packet Core (EPC) that performs various management and control functions of the LTE/LTE-A network. For example, the EPC may include a mobility management entity (MME) that is responsible for idle-mode UE paging and tagging procedures including retransmissions. The EPC may also provide a communication interface between various RANs and other networks.

In various embodiments, the individual cells 108, 112a-b, and/or 116a-e may have different transmit powers than one or more of the other cells 108, 112a-b, and/or 116a-e. The transmit power of the cell 108, 112a-b, and/or 116a-e may generally correspond to the coverage area of the cell 108, 112a-b, and/or 116a-e as illustrated by the associated circle shown in FIG. 1. For example, cell 108 may be a relatively high power cell (e.g., a macro cell) with a large coverage area. Cells 112a-b may have a transmit power and coverage area that are less than the transmit power and coverage area, respectively, of cell 108. In some embodiments, cells 112a-b may be referred to as micro cells. Cells 116a-e may have a transmit power and coverage area that are less than the transmit power and coverage area, respectively, of the cells 112a-b. In some embodiments, cells 116a-e may be referred to as small cells, pico cells or femto cells. The coverage areas of different cells 108, 112a-b, and/or 116a-e may overlap with the coverage area of one or more other cells 108, 112a-b, and/or 116a-e, e.g., as shown in FIG. 1. It will be apparent that the network 100 may include any suitable number and/or arrangement of cells 108, 112a-b, and/or 116a-e.

In various embodiments, individual cells 108, 112a-b, and/or 116a-e may be associated with respective carrier frequencies. Communications between the UE 104a-b and the eNB via a given cell 108, 112a-b, and/or 116a-e may use the carrier frequency associated with that cell. In some embodiments, a plurality of cells 108, 112a-b, and/or 116a-e may be associated with the same carrier frequency. For example, cells 108, 112a-b, and/or 116a-e with different coverage areas that do not substantially overlap may be associated with the same carrier frequency. In some embodiments, the cells 108, 112a-b, and/or 116a-e with the same or similar transmit power may be associated with the same carrier frequency. For example, in the network 100 shown in FIG. 1, cell 108 may be associated with a first carrier frequency, cells 112a-b may be associated with a second carrier frequency, and cells 116a-e may be associated with a third carrier frequency.

Figure 2:
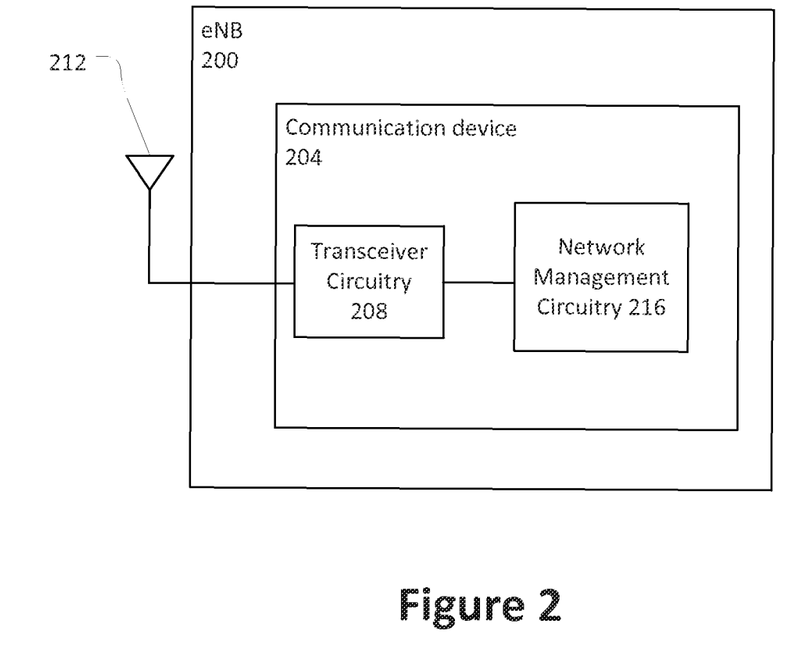
FIG. 2 schematically illustrates an evolved Node B (eNB) in accordance with various embodiments.

FIG. 2 schematically illustrates an eNB 200 in accordance with various embodiments. The eNB 200 may communicate with the UE 104a and/or UE 104b via one or more of cells 108, 112a-b, and/or 116a-e. In some embodiments, each cell 108, 112a-b, and/or 116a-e may be associated with a different eNB 200. In other embodiments, one eNB 200 may communicate over a plurality of cells 108, 112a-b, and/or 116a-e. The eNB 200 may include a communication device 204 that implements various communication protocols in order to effectuate communication with the UEs 104a-b. The communication device 204 may be a chip, chipset, or other collection of programmed and/or preconfigured circuitry. In some embodiments, the communication device 204 may include or be part of baseband circuitry, radio-frequency circuitry, etc.

The communication device 204 may include transceiver circuitry 208 to wirelessly communicate with the UEs 104a-b. The transceiver circuitry 208 may be coupled with one or more antennas 212 of the eNB 200 to transmit wireless signals to, and/or receive wireless signals from, the UEs 108a-e. The communication device 204 may further include network management circuitry 216 coupled to the transceiver circuitry 208.

FIG. 3 schematically illustrates the UE 300 in accordance with various embodiments. The UE 300 may correspond to the UE 104a and/or UE 104b illustrated in FIG. 1.

The UE 300 may include a communication device 304 that implements various communication protocols in order to effectuate communication with the eNB 200 (e.g., via one or more of cells 108, 112a-b, and/or 116a-e. The communication device 304 may be a chip, chipset, or other collection of programmed and/or preconfigured circuitry. In some embodiments, the communication device 304 may include or be part of baseband circuitry, radio-frequency circuitry, etc.

The communication device 304 may include transceiver circuitry 308 to wirelessly communicate with the eNB 200 over a wireless communication network (e.g., the RAN). The transceiver circuitry 308 may be coupled with one or more antennas 312 of the UE 300 to transmit wireless signals to, and/or receive wireless signals from, the eNB 200. The communication device 304 may further include control circuitry 316 coupled to the transceiver circuitry 308 and mobility circuitry 320 coupled to the control circuitry 316.

In various embodiments, when the UE 300 is actively communicating over the network 100 (e.g., when the UE 300 has one or more active packet data network (PDN) connections on the network 100), the UE 300 may be in a radio resource control (RRC) connected mode with the eNB 200 via one or more of cells 208, 112a-b, and/or 116a-e. When the UE 300 no longer has active PDN connections on the network 100, the network management circuitry 216 of the eNB 200 may activate an inactivity timer. The inactivity timer may expire after a pre-defined time period from a starting time of the inactivity timer. When the inactivity timer expires, the network management circuitry 216 may instruct the UE 300 to enter an RRC idle mode (e.g., by transmitting an RRC connection release message to the UE 300).

In the RRC idle mode, the UE 300 may not be able to transmit or receive data packets in the user plane. No RRC context information for the UE 300 may be stored at the eNB 200. However, the UE 300 may maintain an RRC idle mode connection on one of the cells 108, 112a-b, and/or 116a-c to receive paging messages and/or other signaling (e.g., a system information broadcast) from the network 100 (e.g., from the MME). In embodiments, the maintenance of the RRC idle mode connection may be referred to as "camping" on the cell 108, 112a-b, and/or 116a-c. If the UE 300 receives a paging message, or if the UE 300 initiates a process (e.g., application) that requires a user plane connection on the network 100, the UE 300 may re-enter the RRC connected mode on the same cell 108, 112a-b, 116a-e on which the UE 300 maintained the RRC idle mode connection.

In various embodiments, the control circuitry 316 may receive (e.g., via the transceiver circuitry 308) one or more cell reselection priority configurations. Individual cell reselection priority configurations may indicate a relative priority of carrier frequencies (e.g., the first carrier frequency, the second carrier frequency, and the third carrier frequency) and/or individual cells (e.g., cells 108, 112a-b, and/or 116a-e) for use by the UE 300. For example, in some embodiments, the one or more cell reselection priority configurations may be used by the UE 300 for selection of a cell 108, 112a-b, and/or 116a-e with which to maintain the RRC idle mode connection during the RRC idle mode.

In some embodiments, the network management circuitry 216 may transmit (e.g., via transceiver circuitry 208) the one or more cell reselection priority configurations to the UE 300 via broadcast signaling (e.g., to be received by a plurality of UEs) or via designated signaling that is designated for the UE 300. In some embodiments, the network management circuitry 216 may transmit the one or more cell reselection priority configurations to the UE 300 as part of an RRC connection release process. For example, the one or more cell reselection priority configurations may be included in the RRC connection release message that instructs the UE 300 to enter the RRC idle mode from the RRC connected mode. Additionally, or alternatively, the one or more cell reselection priority configurations may be included in a system information broadcast (SIB) message.

In embodiments, the one or more cell reselection priority configurations may be designated for different levels or ranges of mobility (e.g., speed of movement) of the UE 300. In various embodiments, the mobility circuitry 320 may estimate the mobility of the UE 300, and the control circuitry 316 may select a cell reselection priority configuration for use based on the estimated mobility. The mobility circuitry 320 may estimate the mobility of the UE 300, for example, in accordance with 3GPP Technical Specification 36.304. The control circuitry 316 may establish a connection with a cell (e.g., cell 108, 112*a-b*, and/or 116*a-e*) based on the selected cell reselection priority configuration.

In some embodiments, the UE 300 may receive a plurality of cell reselection priority configurations designated for different levels of mobility, and the control circuitry 316 may select one of the cell reselection priority configurations based on the estimated mobility of the UE 300. In other embodiments, the UE 300 may receive one or more cell reselection priority configurations, and may choose not to use the one or more cell reselection priority configurations if the estimated mobility of the UE 300 is above a threshold (e.g., if the UE 300 has high mobility).

For example, in some embodiments, the transceiver circuitry 308 of the UE 300 may receive a single cell reselection priority configuration designated for a mobility level of the UE 300 below a threshold. In some embodiments, the message that includes the cell reselection priority configuration may also include an indicator (e.g., a bit) to indicate whether the cell reselection priority configuration should be ignored by the UE 300 for cell selection if the estimated mobility of the UE 300 is above the threshold. For example, the indicator may have a first value to indicate that the UE 300 is to ignore the cell reselection priority configuration for cell selection if the estimated mobility of the UE 300 is above the threshold or a second value to indicate that the UE 300 is to use the cell reselection priority configuration even if the estimated mobility of the UE 300 is above the threshold. In some embodiments, the threshold may be configurable by the network 100. In other embodiments, the UE 300 may not receive an indicator, and may be programmed to ignore the cell reselection priority configuration for cell selection if the estimated mobility of the UE 300 is above the threshold.

If the UE 300 ignores the cell reselection priority configuration, the control circuitry 316 may select a cell 108, 112*a-b*, and/or 116*a-e* for the RRC idle mode connection without regard to the cell reselection priority configuration. For example, the control circuitry 316 may select a cell 108, 112*a-b*, and/or 116*a-e* based on a pre-determined priority. In some embodiments, the UE 300 with high mobility may prefer the macro cell 108 for the RRC idle mode connection.

In another example in accordance with various embodiments, the transceiver circuitry 308 of the UE 300 may receive three cell reselection priority configurations, including a high speed configuration, a medium speed configuration, and a low speed configuration. The UE 300 may select the high speed configuration when the mobility circuitry 320 estimates a high level of mobility (e.g., when the estimated mobility is above a first threshold). The UE 300 may select the medium speed configuration when the mobility circuitry 320 estimates a medium level of mobility (e.g., when the estimated mobility is below the first threshold and above a second threshold that is lower than the first threshold). The UE 300 may select the low speed configuration when the mobility circuitry 320 estimates a low level of mobility (e.g., when the estimated mobility is below the second threshold). It will be apparent that other embodiments may include a different number of cell reselection priority configurations and corresponding mobility levels. For example, in some embodiments, the UE 300 may receive two cell reselection priority configurations or four or more cell reselection priority configurations.

As discussed above, in some embodiments, the cell reselection priority configurations may indicate the relative priority of different carrier frequencies. For example, the low speed configuration may prioritize the carrier frequency corresponding to the small (e.g., micro or femto) cells 116*a-e* over the carrier frequencies corresponding to the medium (e.g., micro) cell 112*a-b* and the large (e.g., macro) cell 108. In some embodiments, the low speed configuration may further prioritize the carrier frequency corresponding to the medium cells 112*a-b* over the carrier frequency corresponding to the large cell 108. For a UE 300 at low speed (e.g., stationary or moving slowly), the UE 300 is likely to stay within the coverage range of the low power cells 116*a-e* for an extended period of time. Instructing the UE 300 to connect with the small cell 116*a-e* may reduce congestion on the large cell 108, thereby improving performance of the network 100.

In some embodiments, the high speed configuration may prioritize the carrier frequency corresponding to the large cell 108 over the carrier frequencies corresponding to the medium cell 112*a-b* and small cells 116*a-e*. In some embodiments, the high speed configuration may further prioritize the carrier frequency corresponding to the medium cell 112*a-b* over the carrier frequency corresponding to the small cells 116*a-e*.

If the UE 300 is moving at high speed and is connected to one of the small cells 116*a-e*, the UE 300 will leave the coverage area of the corresponding small cell 116*a-b* relatively quickly, requiring the UE 300 to switch its RRC idle mode connection to another cell (e.g., another small cell 116*a-e*, a medium cell 112*a-b* or the large cell 108). Accordingly, the UE 300 would need to perform cell reselection frequently, which increases traffic on the network 100. The use of different cell reselection priority configurations as described herein allows the UEs 300 that are moving at high speed to remain on the large cell 108, while the UEs 300 that are stationary or moving at low speed are connected to the small cells 116*a-e* (e.g., when available).

In embodiments that include a medium speed configuration, the medium speed configuration may prioritize the carrier frequency corresponding to the medium cells 112*a-b* over the carrier frequencies corresponding to the small cells 116*a-e* and the large cell 108. In some embodiments, the medium speed configuration may further prioritize the carrier frequency corresponding to the large cell 108 over the carrier frequency corresponding to the small cells 116*a-e*. Alternatively, the medium speed configuration may prioritize the carrier frequency corresponding to the small cells 116*a-e* over the carrier frequency corresponding to the large cell 108.

In various embodiments, the control circuitry 316 of the UE 300 may establish a connection with a cell 108, 112*a-b*, and/or 116*a-e* based on the selected cell reselection priority configuration. The connection may be, for example, an RRC idle mode connection. As an example, referring to the UEs 104*a-b* of FIG. 1, if the UEs 104*a-b* select the low speed configuration, the UE 104*a* may establish a connection on the third frequency with cell 116*c*. The UE 104*b* may establish a connection on the second frequency with cell 112*a* or cell 112*b*, since the UE 104*b* is not in the coverage area of any small cell 116*a-e* that operates on the third frequency.

Alternatively, if the UEs 104*a-b* select the high speed configuration, the UEs 104*a-b* may establish a connection on the first frequency with the large cell 108. If the UEs 104*a-b* select the medium speed configuration, the UE 104*a* may establish a connection on the second frequency with the medium cell 112*b* and the UE 104*b* may establish a connection on the second frequency with the medium cell 112*a* or the medium cell 112*b*.

The relative priorities of the carrier frequencies and/or cells 108, 112*a-b*, and/or 116*a-e* for the individual cell reselection priority configurations described herein are presented as examples. In embodiments, the network 100 and/or eNB 200 may adjust the relative priorities based on conditions in the network 100, such as the number of UEs 104*a-b* connected to specific cells 108, 112*a-b*, and/or 116*a-e* or on specific carrier frequencies.

In some embodiments, one or more of the cell reselection priority configurations may indicate a relative priority of individual cells 108, 112*a-b*, and/or 116*a-e* in addition to or instead of indicating a relative priority of individual carrier frequencies. In some embodiments, the UE 300 may receive frequency priority information that indicates the relative priority of the carrier frequencies and cell-specific priority information that indicates the relative priority of the individual cells 108, 112*a-b*, and/or 116*a-e*. For example, the cell-specific priority information may indicate one or more cells 108, 112*a-b*, and/or 116*a-e* that are prioritized over other cells. The frequency priority information and the cell-specific priority message may be included in different messages (e.g., RRC messages) or the same message.

When both cell-specific priority and carrier frequency priority are indicated for a given cell reselection priority configuration, the cell-specific priority may take priority over the carrier frequency priority. Accordingly, the UE 300 may attempt to connect with the one or more cells 108, 112*a-b*, and/or 116*a-e* identified by the cell-specific priority information, and may use the frequency priority information to select the carrier frequency only if the one or more cells 108, 112*a-b*, and/or 116*a-e* identified by the cell-specific priority information are unavailable.

In some embodiments, the message received by the UE 300 may include cell-specific priority information for a plurality of the cell reselection priority configurations, with different cell-specific priorities designated for different mobility levels of the UE 300. Alternatively, the UE 300 may receive a single set of cell-specific priority information that indicates a relative priority of one or more of the cells 108, 112*a-b*, and/or 116*a-e*. The UE 300 may associate the cell-specific priority information with one or more of the cell reselection priority configurations and exclude the cell-specific priority information from one or more other cell reselection priority configurations (e.g., the high speed configuration). Accordingly, the UE 300 may decide not to use the cell-specific priority information in selecting a cell 108, 112*a-b*, and/or 116*a-e* if the estimated mobility of the UE 300 is above a threshold (e.g., if the UE 300 has high mobility). If the UE has high mobility, the UE 300 may select a carrier frequency for the RRC connection (e.g., RRC idle mode connection) based on the frequency priority information (if frequency priority information is provided for the high mobility level) and excluding the cell-specific priority information.

As an example, the cell-specific priority information may indicate that cell 112*b* is prioritized. The network 100 and/or eNB 200 may prioritize the cell 112*b*, for example, if cell 112*b* is loaded relatively lightly. The UEs 104*a-b* may connect with the cell 112*b* if the UEs 104*a-b* have low mobility or medium mobility, and may choose to connect with the cell 108 if the UEs 104*a-b* have high mobility.

Additionally, or alternatively, the control circuitry 316 of the UE 300 may determine whether or not to use the cell-specific priority information for cell selection based on whether the UE 300 is capable of communicating on the network 100 using carrier aggregation and/or dual connectivity. In carrier aggregation and dual connectivity, the UE 300 may communicate over a plurality of cells 108, 112*a-b*, and/or 116*a-e* simultaneously.

In various embodiments, the control circuitry 316 may determine if the UE 300 is capable of carrier aggregation of dual connectivity, and, if the UE 300 is determined to be capable of carrier aggregation or dual connectivity, select a carrier frequency or cell 108, 112*a-b*, and/or 116*a-e* without regard to the cell-specific priority information. If the UE 300 is determined not to be capable of carrier aggregation or dual connectivity, the control circuitry 316 may select a cell 108, 112*a-b*, and/or 116*a-e* with which to connect based on the cell-specific priority information.

In some embodiments, if the UE 300 is determined to be capable of carrier aggregation or dual connectivity, the UE 300 may select a carrier frequency on which to connect using the frequency priority information (e.g., based on the mobility of the UE 300). Alternatively, or additionally, the UE 300 may prioritize and/or select the carrier frequency associated with the large cell 108. The UE 300 may receive, from the eNB 200, an identifier to indicate the macro cell (e.g., the large cell 108) and/or the carrier frequency of the macro cell to enable the UE 300 to prioritize the macro cell if the UE 300 is capable of carrier aggregation or dual connectivity.

For the UE 300 to communicate using carrier aggregation or dual connectivity, the UE 300 may need to be connected to a cell that supports carrier aggregation or dual connectivity, respectively (e.g., the macro cell 108). Accordingly, if the UE 300 is connected to a small cell 116*a-e* when the UE 300 wakes up from the RRC idle mode and enters the RRC connected mode, the UE 300 may switch its RRC connection to the macro cell 108 to use carrier aggregation or dual connectivity. The technique described herein may enable UEs 300 that are capable of carrier aggregation and/or dual connectivity to remain connected to the macro cell 108 during the RRC idle mode.

Figure 4:
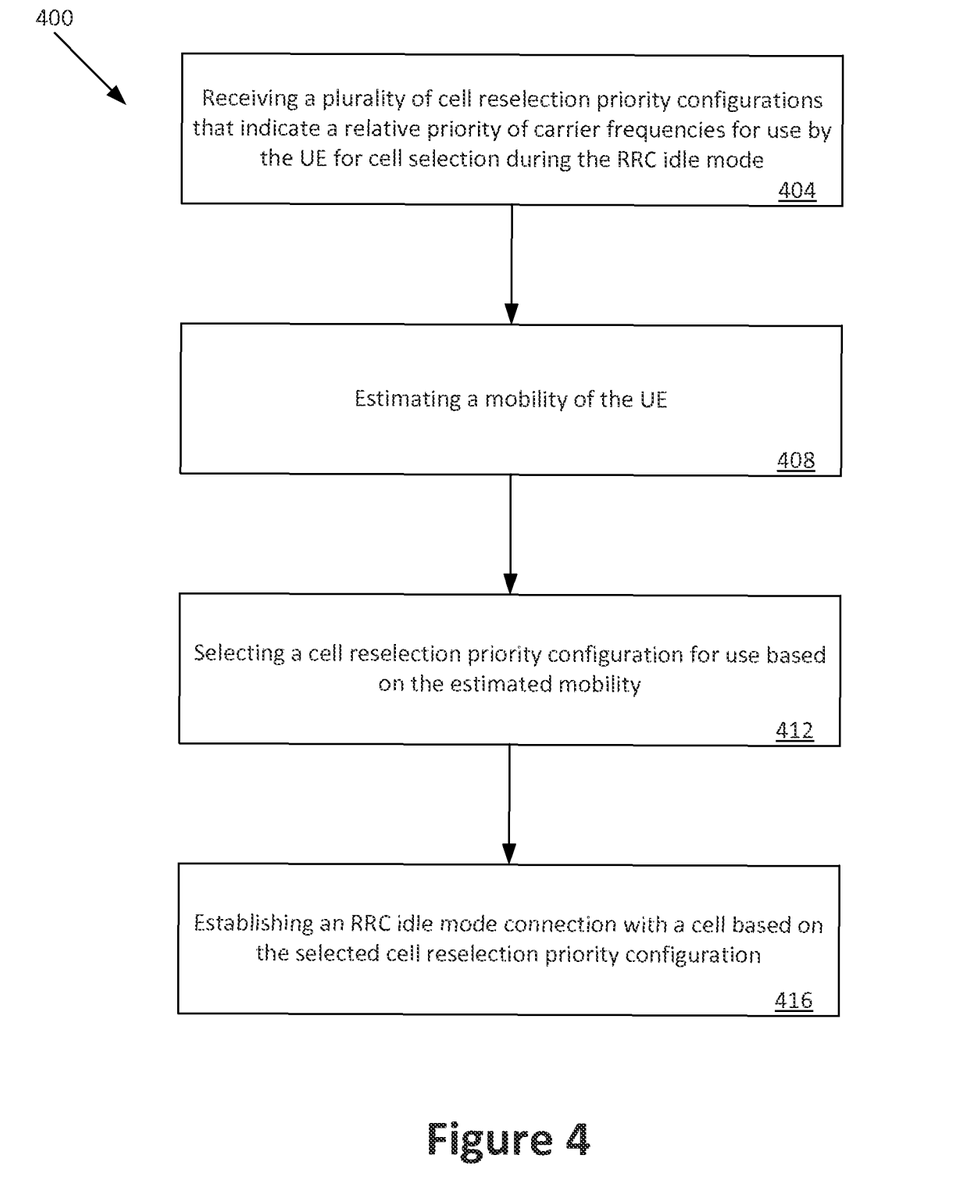
FIG. 4 illustrates a method for cell selection to be performed by a UE in accordance with various embodiments.

FIG. 4 illustrates a method 400 for cell selection that may be performed by a UE (e.g., UEs 104*a-b* and/or UE 300) in accordance with various embodiments. In some embodiments, the UE may include one or more non-transitory computer-readable media having instructions, stored thereon, that when executed cause the UE to perform the method 400.

At 404, the method 400 may include receiving a plurality of cell reselection priority configurations, individual cell reselection priority configurations indicating a relative priority of carrier frequencies for use by the UE for cell selection during the RRC idle mode. In some embodiments, one or more of the cell reselection priority configurations may further indicate the relative priority of one or more individual cells (e.g., cells 108, 112*a-b*, and/or 116*a-e*). The cell reselection priority configurations may be designated for different mobility levels of the UE.

At 408, the method 400 may include estimating a mobility of the UE. For example, the UE may determine the mobility level of the UE, such as low mobility, medium mobility, or high mobility.

At 412, the method 400 may include selecting a cell reselection priority configuration for use based on the estimated mobility. At 416, the method 400 may include establishing an RRC idle mode connection with a cell based on the selected cell reselection priority configuration.

Figure 5:
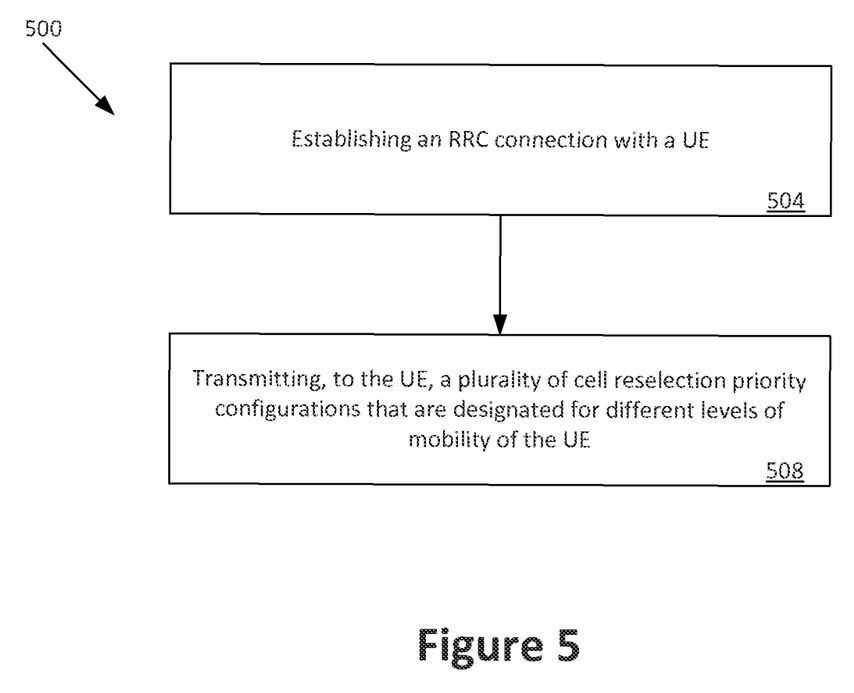
FIG. 5 illustrates a method for network management to be performed by an eNB in accordance with various embodiments.

FIG. 5 illustrates a method 500 for network management that may be performed by an eNB (e.g., eNB 200) in accordance with various embodiments. In some embodiments, the eNB may include one or more non-transitory computer-readable media having instructions, stored thereon, that when executed cause the eNB to perform the method 500.

At 504, the method 500 may include establishing an RRC connection with a UE. At 508, the method 500 may include transmitting, to the UE, a plurality of cell reselection priority configurations that are designated for different levels of mobility of the UE. The individual cell reselection priority configurations may indicate a relative priority of a plurality of carrier frequencies for use by the UE for cell selection during the RRC idle mode. In some embodiments, the plurality of cell reselection priority configurations may be included in an RRC connection release message that instructs the UE to enter the RRC idle mode from the RRC connected mode.

Figure 6:
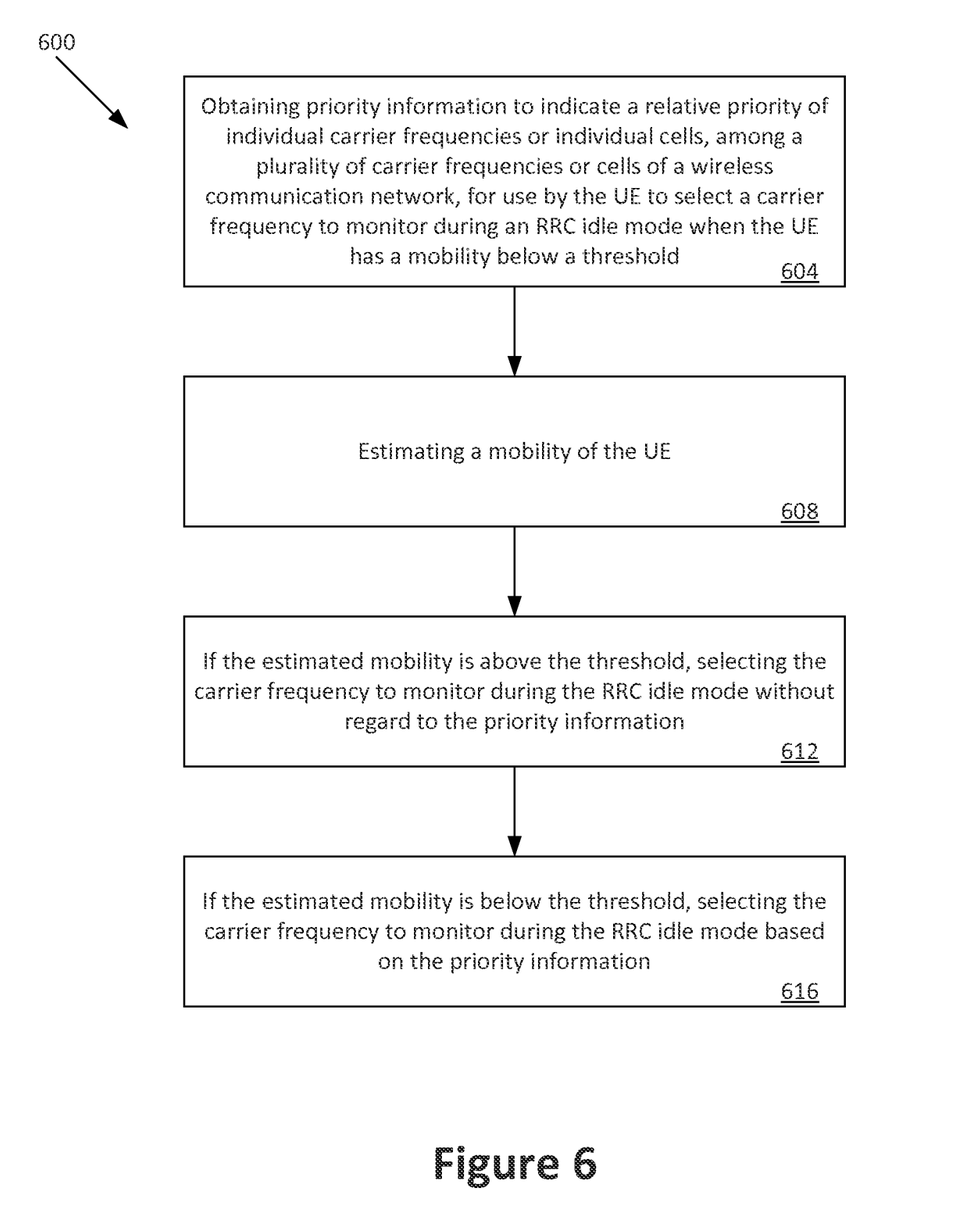
FIG. 6 illustrates another method for cell selection to be performed by a UE in accordance with various embodiments.

FIG. 6 illustrates a method 600 for cell selection that may be performed by a UE (e.g., UEs 104a-b and/or UE 300) in accordance with various embodiments. In some embodiments, the UE may include one or more non-transitory computer-readable media having instructions, stored thereon, that when executed cause the UE to perform the method 600.

At 604, the method 600 may include obtaining priority information to indicate a relative priority of individual carrier frequencies or individual cells, among a plurality of carrier frequencies or cells of a wireless communication network, for use by the UE to select a carrier frequency to monitor during the RRC idle mode when the UE has a mobility below a threshold.

At 608, the method 600 may include estimating a mobility of the UE.

At 612, the method 600 may include, if the estimated mobility is above the threshold, selecting the carrier frequency to monitor during the RRC idle mode without regard to the cell-specific priority information.

At 616, the method 600 may include, if the estimated mobility is below the threshold, selecting the carrier frequency to monitor based on the priority information (e.g., selecting the carrier frequency associated with a prioritized carrier frequency and/or cell that is indicated by the priority information).

Figure 7:
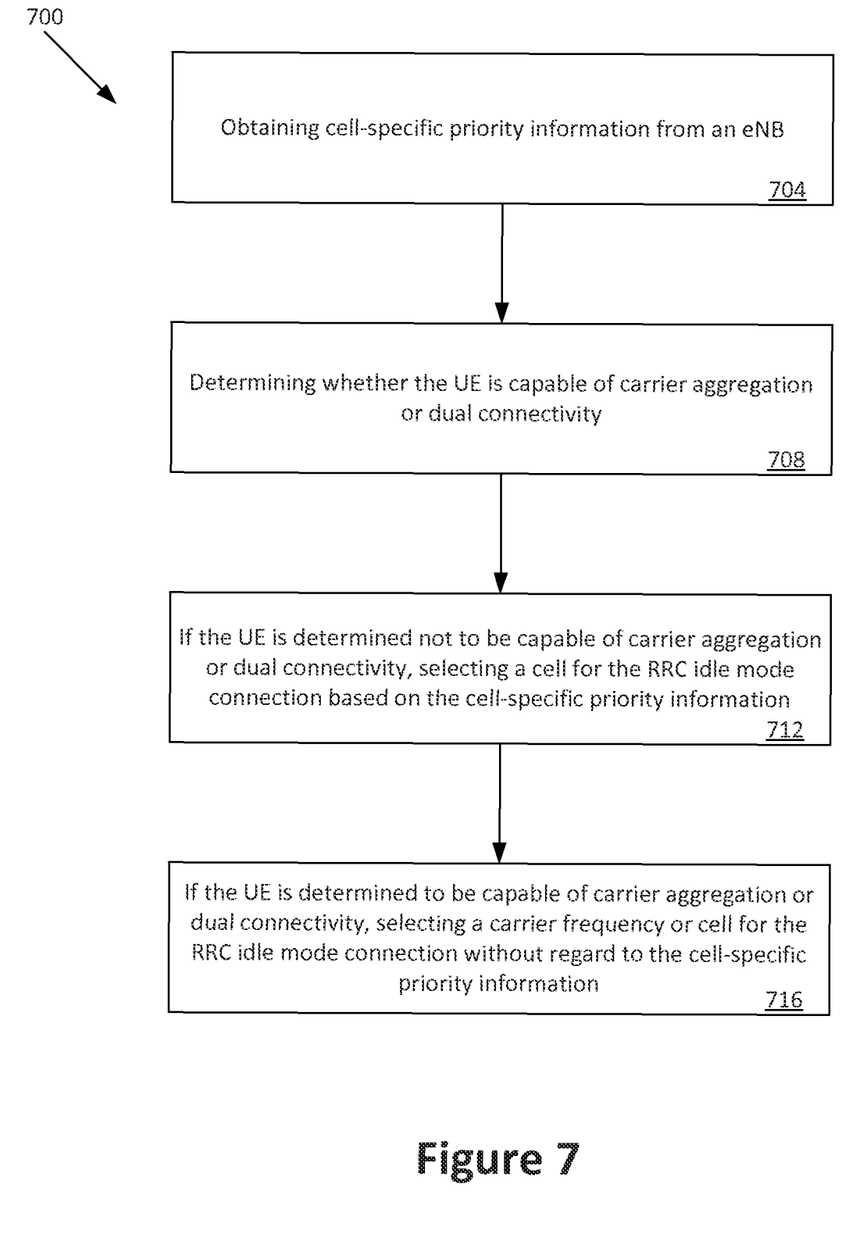
FIG. 7 illustrates another method for cell selection to be performed by a UE in accordance with various embodiments.

FIG. 7 illustrates a method 700 for cell selection that may be performed by a UE (e.g., UEs 104a-b and/or UE 300) in accordance with various embodiments. In some embodiments, the UE may include one or more non-transitory computer-readable media having instructions, stored thereon, that when executed cause the UE to perform the method 700.

At 704, the method 700 may include obtaining cell-specific priority information from an eNB. The cell-specific priority information may indicate one or more cells of a wireless communication network that are prioritized over other cells for an RRC idle mode connection of the UE.

At 708, the method 700 may include determining whether the UE is capable of carrier aggregation or dual connectivity.

At 712, the method 700 may include, if the UE is determined not to be capable of carrier aggregation or dual connectivity, selecting a cell for the RRC idle mode connection based on the cell-specific priority information.

At 716, the method 700 may include, if the UE is determined to be capable of carrier aggregation or dual connectivity, selecting a carrier frequency or cell for the RRC idle mode connection without regard to the cell-specific priority information.

Figure 8:
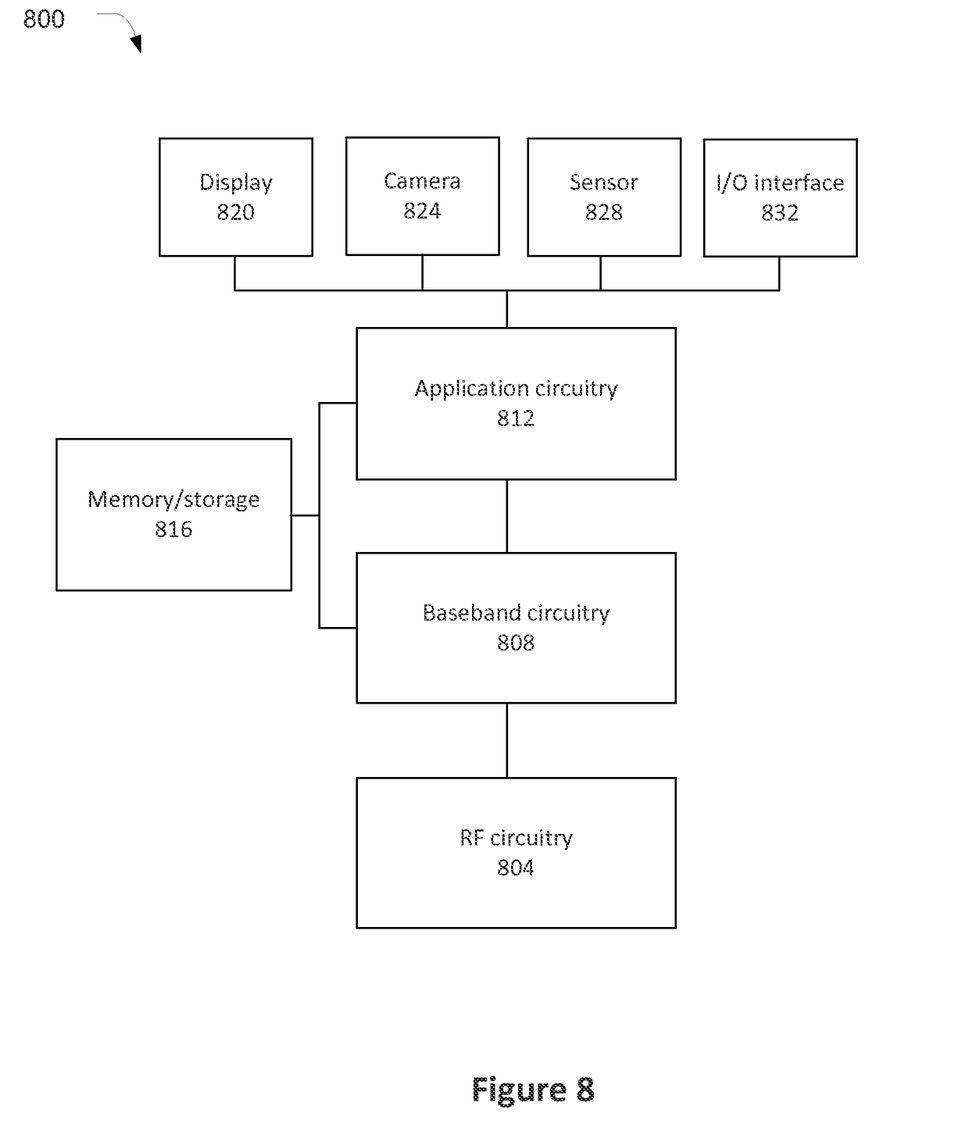
FIG. 8 is a block diagram of an example computing device that may be used to practice various embodiments described herein.

The UEs 104a-b, eNB 200, or UE 300 as described herein may be implemented into a system using any suitable hardware, firmware, or software configured as desired. FIG. 8 illustrates, for one embodiment, an example system 800 comprising radio frequency (RF) circuitry 804, baseband circuitry 808, application circuitry 812, memory/storage 816, display 820, camera 824, sensor 828, and input/output (I/O) interface 832, coupled with each other at least as shown.

The application circuitry 812 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 816 and configured to execute instructions stored in the memory/storage 816 to enable various applications or operating systems running on the system 800.

The baseband circuitry 808 may include circuitry such as, but not limited to, one or more single-core or multi-core processors. The processor(s) may include a baseband processor. The baseband circuitry 808 may handle various radio control functions that enable communication with one or more radio networks via the RF circuitry 804. The radio control functions may include, but are not limited to, signal modulation, encoding, decoding, radio frequency shifting, etc. In some embodiments, the baseband circuitry 808 may provide for communication compatible with one or more radio technologies. For example, in some embodiments, the baseband circuitry 808 may support communication with an E-UTRAN or other wireless metropolitan area networks (WMAN), a wireless local area network (WLAN), or a wireless personal area network (WPAN). Embodiments in which the baseband circuitry 808 is configured to support radio communications of more than one wireless protocol may be referred to as multi-mode baseband circuitry.

In various embodiments, baseband circuitry 808 may include circuitry to operate with signals that are not strictly considered as being in a baseband frequency. For example, in some embodiments, baseband circuitry 808 may include circuitry to operate with signals having an intermediate frequency, which is between a baseband frequency and a radio frequency.

In some embodiments, the communication device 204, transceiver circuitry 208, network management circuitry 216, communication device 304, transceiver circuitry 308, control circuitry 316, and/or mobility circuitry 320 may be embodied in the application circuitry 812 or the baseband circuitry 808.

RF circuitry 804 may enable communication with wireless networks using modulated electromagnetic radiation through a non-solid medium. In various embodiments, the RF circuitry 804 may include switches, filters, amplifiers, etc., to facilitate the communication with the wireless network.

In various embodiments, RF circuitry 804 may include circuitry to operate with signals that are not strictly considered as being in a radio frequency. For example, in some embodiments, RF circuitry 804 may include circuitry to operate with signals having an intermediate frequency, which is between a baseband frequency and a radio frequency.

In some embodiments, the transceiver circuitry 208 or 308 may be embodied in the RF circuitry 804.

In some embodiments, some or all of the constituent components of the baseband circuitry 808, the application circuitry 812, or the memory/storage 816 may be implemented together on a system on a chip (SOC).

Memory/storage 816 may be used to load and store data or instructions, for example, for system 800. Memory/storage 816 for one embodiment may include any combination of suitable volatile memory (e.g., dynamic random access memory (DRAM)) or non-volatile memory (e.g., Flash memory).

In various embodiments, the I/O interface 832 may include one or more user interfaces designed to enable user interaction with the system 800 or peripheral component interfaces designed to enable peripheral component interaction with the system 800. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 828 may include one or more sensing devices to determine environmental conditions or location information related to the system 800. In some embodiments, the sensors may include, but are not limited to, a gyro sensor, an accelerometer, a proximity sensor, an ambient light sensor, and a positioning unit. The positioning unit may also be part of, or interact with, the baseband circuitry 808 or RF circuitry 804 to communicate with components of a positioning network, e.g., a global positioning system (GPS) satellite.

In various embodiments, the display 820 may include a display (e.g., a liquid crystal display, a touch screen display, etc.).

In various embodiments, the system 800 may be a mobile computing device such as, but not limited to, a laptop computing device, a tablet computing device, a netbook, an ultrabook, a smartphone, etc. In various embodiments, system 800 may have more or fewer components, or different architectures.

The following paragraphs provide some Examples in accordance with various embodiments.

Example 1 is an apparatus to be employed by a user equipment (UE), the apparatus comprising: transceiver circuitry to communicate over a wireless communication network including a plurality of cells, wherein individual cells are associated with respective carrier frequencies; mobility circuitry to estimate a mobility of the UE; and control circuitry coupled to the transceiver circuitry and the mobility circuitry. The control circuitry is to: receive, via the transceiver circuitry, a plurality of cell reselection priority configurations, wherein individual cell reselection priority configurations indicate a relative priority of the carrier frequencies or the individual cells for use by the UE to establish a radio resource control (RRC) idle mode connection; select a first cell reselection priority configuration for use based on the estimated mobility; and establish the RRC idle mode connection with a first cell of the plurality of cells based on the first cell reselection priority configuration.

Example 2 is the apparatus of Example 1, wherein the plurality of cell reselection priority configurations are designated for different ranges of UE mobility.

Example 3 is the apparatus of Example 2, wherein the control circuitry is to receive three cell reselection priority configurations.

Example 4 is the apparatus of Example 1, wherein the individual cell reselection priority configurations indicate the relative priority of the carrier frequencies, and wherein the different carrier frequencies are associated with cells of different transmission powers.

Example 5 is the apparatus of Example 4, wherein the estimated mobility of the UE is above a threshold and wherein the first cell reselection priority configuration prioritizes a high power carrier frequency over a low power carrier frequency.

Example 6 is the apparatus of Example 4, wherein the estimated mobility of the UE is below a threshold and wherein the first cell reselection priority configuration prioritizes a low power carrier frequency over a high power carrier frequency.

Example 7 is the apparatus of Example 1, wherein the plurality of cell reselection priority configurations are received via broadcast signaling.

Example 8 is the apparatus of Example 1, wherein the plurality of cell reselection priority configurations are received via designated signaling that is designated for the UE.

Example 9 is the apparatus of any one of Examples 1 to 8, wherein at least one of the plurality of cell reselection priority configurations indicate a relative priority of individual cells.

Example 10 is an apparatus to be employed by an enhanced Node B (eNB), the apparatus comprising: transceiver circuitry to communicate with a user equipment (UE) via a cell of a wireless communication network, wherein the wireless communication network includes a plurality of cells with overlapping coverage areas and wherein individual cells are associated with respective carrier frequencies; and network management circuitry to transmit, to the UE, a plurality of cell reselection priority configurations that are designated for different levels of mobility of the UE, wherein individual cell reselection priority configurations indicate a relative priority of the carrier frequencies or the individual cells for use by the UE to establish a radio resource control (RRC) idle mode connection.

Example 11 is the apparatus of Example 10, wherein the network management circuitry is to transmit the plurality of cell reselection priority configurations in an RRC connection release message that instructs the UE to enter the RRC idle mode.

Example 12 is the apparatus of Example 10, wherein the network management circuitry is to transmit three cell reselection priority configurations to the UE.

Example 13 is the apparatus of Example 10, wherein the individual cell reselection priority configurations indicate the relative priority of the carrier frequencies, and wherein the different carrier frequencies are associated with cells of different transmission powers.

Example 14 is the apparatus of Example 13, wherein a first cell reselection priority configuration of the plurality of cell reselection priority configurations is designated for a first mobility level of the UE and prioritizes a high power carrier frequency over a low power carrier frequency, wherein a second cell reselection priority configuration of the plurality of cell reselection priority configurations is designated for a second mobility level of the UE that is slower than the first mobility level, and wherein the second cell reselection priority configuration prioritizes the low power carrier frequency over the high power carrier frequency.

Example 15 is the apparatus of Example 10, wherein the plurality of cell reselection priority configurations are transmitted via broadcast signaling.

Example 16 is the apparatus of Example 10, wherein the plurality of cell reselection priority configurations are transmitted via designated signaling that is designated for the UE.

Example 17 is the apparatus of any one of Examples 10 to 16, wherein at least one of the plurality of cell reselection priority configurations indicate a relative priority of individual cells.

Example 18 is one or more non-transitory computer-readable media having instructions, stored thereon, that when executed cause a user equipment (UE) to: obtain priority information to indicate a relative priority of individual carrier frequencies or individual cells, among a plurality of carrier frequencies or cells of a wireless communication network, for use by the UE to select a carrier frequency to monitor during a radio resource control (RRC) idle mode of the UE when a mobility of the UE is below a threshold; estimate a mobility of the UE; if the estimated mobility is below the threshold, select a carrier frequency or cell to monitor during the RRC idle mode based on the priority information; and if the estimated mobility is above a threshold, select a first carrier frequency or cell to monitor during the RRC idle mode without regard to the priority information.

Example 19 is the one or more media of Example 18, wherein the instructions, when executed, further cause the UE to obtain an indicator having a value to indicate whether the UE is to ignore the priority information for selection of the carrier frequency or cell to monitor during the RRC idle mode when the mobility of the UE is above the threshold.

Example 20 is the one or more media of Example 18, wherein the priority information includes a plurality of cell reselection priority configurations that are designated for different levels of mobility of the UE, wherein individual cell reselection priority configurations indicate a relative priority of the carrier frequencies.

Example 21 is the one or more media of any one of Examples 18 to 20, wherein the instructions, when executed, further cause the UE to monitor the first carrier frequency for paging messages or system information broadcasts during the RRC idle mode.

Example 22 is the one or more media of Example 21, wherein the priority information is included in an RRC connection release message that instructs the UE to enter the RRC idle mode.

Example 23 is one or more non-transitory computer-readable media having instructions, stored thereon, that when executed cause a user equipment (UE) to: obtain, from an enhanced Node B (eNB), cell-specific priority information to indicate one or more cells of a wireless communication network that are prioritized over other cells for a radio resource control (RRC) idle mode connection of the UE; determine whether the UE is capable of carrier aggregation or dual connectivity; if the UE is determined not to be capable of carrier aggregation or dual connectivity, select a first cell for the RRC idle mode connection based on the cell-specific priority information; and if the UE is determined to be capable of carrier aggregation or dual connectivity, select a carrier frequency or cell for the RRC idle mode connection without regard to the cell-specific priority information.

Example 24 is the one or more media of Example 23, wherein the instructions, when executed, further cause the UE to: obtain, from the eNB, frequency priority information to indicate a relative priority of individual carrier frequencies, among a plurality of carrier frequencies of the wireless communication network, for the radio resource control (RRC) idle mode connection of the UE; and if the UE is determined to be capable of carrier aggregation or dual connectivity, select the carrier frequency or cell for the RRC idle mode connection based on the frequency priority information.

Example 25 is the one or more media of Example 23 or Example 24, wherein the instructions, when executed, further cause the UE to: obtain, from the eNB, an identifier to indicate a macro frequency carrier or macro cell that provides macro-coverage for the wireless communication network; and if the UE is determined to be capable of carrier aggregation or dual connectivity, select the macro frequency carrier or the macro cell for the RRC idle mode connection.

Example 26 is a user equipment (UE) comprising: means to obtain priority information to indicate a relative priority of individual carrier frequencies or individual cells, among a plurality of carrier frequencies or cells of a wireless communication network, for use by the UE to select a carrier frequency to monitor during a radio resource control (RRC) idle mode of the UE when a mobility of the UE is below a threshold; means to estimate a mobility of the UE; means to, if the estimated mobility is below the threshold, select a carrier frequency or cell to monitor during the RRC idle mode based on the priority information; and means to, if the estimated mobility is above a threshold, select a first carrier frequency or cell to monitor during the RRC idle mode without regard to the priority information.

Example 27 is the UE of Example 26, further comprising means to obtain an indicator having a value to indicate whether the UE is to ignore the priority information for selection of the carrier frequency or cell to monitor during the RRC idle mode when the mobility of the UE is above the threshold.

Example 28 is the UE of Example 26, wherein the priority information includes a plurality of cell reselection priority configurations that are designated for different levels of mobility of the UE, wherein individual cell reselection priority configurations indicate a relative priority of the carrier frequencies.

Example 29 is the UE of any one of Examples 26 to 28, further comprising means to monitor the first carrier frequency for paging messages or system information broadcasts during the RRC idle mode.

Example 30 is the UE of Example 29, wherein the priority information is included in an RRC connection release message that instructs the UE to enter the RRC idle mode.

Example 31 is a user equipment (UE) comprising: means to obtain, from an enhanced Node B (eNB), cell-specific priority information to indicate one or more cells of a wireless communication network that are prioritized over other cells for a radio resource control (RRC) idle mode connection of the UE; means to determine whether the UE is capable of carrier aggregation or dual connectivity; means to, if the UE is determined not to be capable of carrier aggregation or dual connectivity, select a first cell for the RRC idle mode connection based on the cell-specific priority information; and means to, if the UE is determined to be capable of carrier aggregation or dual connectivity, select a carrier frequency or cell for the RRC idle mode connection without regard to the cell-specific priority information.

Example 32 is the UE of Example 31, further comprising: means to obtain, from the eNB, frequency priority information to indicate a relative priority of individual carrier frequencies, among a plurality of carrier frequencies of the wireless communication network, for the radio resource control (RRC) idle mode connection of the UE; and means to, if the UE is determined to be capable of carrier aggregation or dual connectivity, select the carrier frequency or cell for the RRC idle mode connection based on the frequency priority information.

Example 33 is the UE of Example 31 or Example 32, further comprising: means to obtain, from the eNB, an identifier to indicate a macro frequency carrier or macro cell that provides macro-coverage for the wireless communication network; and means to, if the UE is determined to be capable of carrier aggregation or dual connectivity, select the macro frequency carrier or the macro cell for the RRC idle mode connection.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. One or more non-transitory computer-readable media having instructions, stored thereon, that when executed cause a user equipment (UE) to:
    obtain, from an evolved Node B (eNB) of a wireless communication network, priority information to indicate a relative priority of individual carrier frequencies or individual cells, among a plurality of carrier frequencies or cells of the wireless communication network, for use by the UE to select a carrier frequency to monitor during a radio resource control (RRC) idle mode of the UE when a mobility of the UE is below a threshold;
    obtain, from the eNB, an indicator to indicate whether the UE is to ignore the priority information for selection of the carrier frequency or cell to monitor during the RRC idle mode when the mobility of the UE is above the threshold;
    estimate a mobility of the UE;
    if the estimated mobility is above the threshold and the indicator has a first value, select a carrier frequency or cell to monitor during the RRC idle mode without regard to the priority information;
    if the estimated mobility is above the threshold and the indicator has a second value, select a carrier frequency or cell to monitor during the RRC idle mode based on the priority information; and
    if the estimated mobility is below the threshold, select a carrier frequency or cell to monitor during the RRC idle mode based on the priority information without regard to whether the indicator has the first value or the second value.

2. The one or more media of claim 1, wherein the priority information includes a plurality of cell reselection priority configurations that are designated for different levels of mobility of the UE, wherein individual cell reselection priority configurations indicate a relative priority of the carrier frequencies.

3. The one or more media of claim 1, wherein the instructions, when executed, further cause the UE to monitor the carrier frequency for paging messages or system information broadcasts during the RRC idle mode.

4. The one or more media of claim 3, wherein the priority information is included in an RRC connection release message that instructs the UE to enter the RRC idle mode.

5. The one or more media of claim 1, wherein the priority information is included in a system information broadcast (SIB) message.

6. An apparatus to be employed by an enhanced Node B (eNB), the apparatus comprising:
    transceiver circuitry to communicate with a user equipment (UE) via a cell on a carrier frequency of a wireless communication network, wherein the wireless communication network includes a plurality of cells with overlapping coverage areas; and
    network management circuitry coupled to the transceiver circuitry, the network management circuitry to:
        transmit, to the UE, priority information to indicate a relative priority of individual carrier frequencies or individual cells of the wireless communication network, for use by the UE to select a carrier frequency to monitor during a radio resource control (RRC) idle mode; and
        transmit, to the UE, an indicator having a value to indicate whether the UE is to ignore the priority information for selection of the carrier frequency or cell to monitor during the RRC idle mode when a mobility of the UE is above a threshold.

7. The apparatus of claim 6, wherein the priority information and the indicator are included in an RRC connection release message that instructs the UE to enter the RRC idle mode.

8. The apparatus of claim 6, wherein the priority information and the indicator are included in a system information broadcast (SIB) message.

* * * * *